(12) United States Patent
Ogasawara et al.

(10) Patent No.: US 7,506,346 B2
(45) Date of Patent: Mar. 17, 2009

(54) DISK APPARATUS

(75) Inventors: Shinya Ogasawara, Yokohama (JP); Shingo Kage, Kobe (JP); Yukihiro Araki, Fujiidera (JP); Nobuyuki Miroku, Ikoma (JP)

(73) Assignee: Panasonic Corporation, Osaka (JP)

( * ) Notice: Subject to any disclaimer, the term of this patent is extended or adjusted under 35 U.S.C. 154(b) by 352 days.

(21) Appl. No.: 10/576,169

(22) PCT Filed: Oct. 18, 2004

(86) PCT No.: PCT/JP2004/015377

§ 371 (c)(1),
(2), (4) Date: Apr. 19, 2006

(87) PCT Pub. No.: WO2005/038796

PCT Pub. Date: Apr. 28, 2005

(65) Prior Publication Data

US 2007/0067783 A1    Mar. 22, 2007

(30) Foreign Application Priority Data

Oct. 20, 2003   (JP) .............................. 2003-359881

(51) Int. Cl.
*G11B 17/04*  (2006.01)
(52) U.S. Cl. .................................... 720/624
(58) Field of Classification Search ................ 720/624, 720/651, 646, 647; 369/263
See application file for complete search history.

(56) References Cited

U.S. PATENT DOCUMENTS

| | | | | |
|---|---|---|---|---|
| 5,978,339 A * | 11/1999 | Sasaki et al. | ................. | 720/646 |
| 6,324,147 B2 * | 11/2001 | Kanatani et al. | ............ | 720/647 |
| 6,363,045 B2 * | 3/2002 | Sato | ............................ | 720/647 |
| 6,910,217 B2 * | 6/2005 | Kan-o | .......................... | 720/646 |
| 6,918,128 B2 * | 7/2005 | Hasegawa et al. | ........... | 720/647 |
| 2002/0100337 A1 | 8/2002 | Tanaka et al. | | |
| 2003/0007441 A1 | 1/2003 | Wada et al. | | |
| 2003/0039194 A1 | 2/2003 | Tanaka et al. | | |
| 2003/0161253 A1* | 8/2003 | Liao et al. | .................... | 369/263 |

FOREIGN PATENT DOCUMENTS

| | | |
|---|---|---|
| DE | 4326386 | 2/1994 |
| EP | 1321935 | 6/2003 |
| JP | 2000-90529 A | 3/2000 |
| JP | 2000090529 A * | 3/2000 |
| JP | 2002-140850 A | 5/2002 |
| JP | 2003-168254 A | 6/2003 |

* cited by examiner

*Primary Examiner*—Tianjie Chen
(74) *Attorney, Agent, or Firm*—Harness, Dickey & Pierce, PLC

(57) ABSTRACT

The present invention provides a highly reliable disk apparatus which is reduced in size, thickness and weight, and which can surely prevent the double insertion of disk-shaped recording media with a simple structure to thereby prevent a contact between each of the disk-shaped recording media. In the disk apparatus of the present invention, a disk guide is rotatably held in the proximity of an opening for inserting and ejecting a disk-shaped recording medium, which is formed in the stationary frame fixed to the casing, and the disk guide leads the disk-shaped recording medium to the inserting and ejecting operations and also closes at least a part of the above opening.

7 Claims, 11 Drawing Sheets

DISK APPARATUS

TECHNICAL FIELD

The present invention relates to a disk apparatus which records and/or reproduces data on or from a disk-shaped recording medium such as CD, DVD or the like, and in particular, to the disk-loading mechanism of a disk apparatus, for a disk-shaped recording medium.

BACKGROUND OF THE INVENTION

Disk apparatuses which record data on and/or reproduce data from disk-shaped recording media (hereinafter referred to as disks) such as CD, DVD, etc. are today reduced in size, thickness and weight, suitable for portable use or for equipment on vehicles. In a disk apparatus of this type, the block having a turn table and a spindle motor mounted thereon has a floating structure to be supported by the stationary frame, through vibration-absorbing means so as not to directly transmit vibrations from an external to a disk while recording or reproducing. The block having such a floating structure (i.e., a floating block) includes a lot of mechanisms such as a disk carriage-driving mechanism which carries an inserted disk to a recording/reproducing position and ejects the disk from the recording/reproducing position, a disk-clamping mechanism which holds the disk immovable at the recording/reproducing position, and a disk recording/reproducing mechanism which performs recording or reproducing on the disk at the recording/reproducing position (cf. Patent Literature 1).

According to a disk apparatus disclosed in Patent Literature 1, when a disk is inserted from the disk insertion port, the guide pin slides along the circumference edge of the disk and leads the same, and simultaneously, the micro-switch interlocking with the guide pin outputs a disk detection signal to the control circuit. When this disk detection signal is inputted to the control circuit, the reverse rotation motor is driven to rotate the carriage roller in contact with the surface of the disk so as to carry the disk. At this stage, the clamper of the disk-clamping mechanism provided in the floating block is lifted so as to ensure the upper side space above the turn table as a disk-carrying space. In addition, the floating block is held immovable on the stationary frame by a locking means interlocking with the guide pin, in other words, the floating block is locked. The disk led to a position above the turn table is held by the clamper which is rotated due to a force from a coil spring, and simultaneously, the locking means for the floating block which holds the disk is disengaged. As a result, the floating block is completely released from the locking means, and the floating block is supported by the vibration-absorbing means alone and thus is put in a floating state, so that recording or reproducing on the disk becomes possible.

The disk apparatus thus arranged is of the slot loading type in which the disk is directly inserted into the disk apparatus, carried therein and located at the recording/reproducing position. Such slot loading type disk apparatuses are easy to be reduced in size, thickness and weight, and thus are widely employed for portable use or for equipment on vehicles.

There are disk apparatuses of another type, namely, of tray loading type. In a disk apparatus of tray loading type, a disk is placed on the tray, and the tray with the disk is carried in the disk apparatus and located at a recording/reproducing position. The disk apparatus of this type is preferable in view of the following points. In this disk apparatus, a disk can be placed on the tray only after the tray has been ejected. Therefore, an user is prevented from inserting another disk by mistake, when the former disk is placed at the recording/reproducing position. In addition, the user is prevented from touching the disk on which a recording or reproducing operation is being performed, or another disk is prevented from contacting the former disk during the recording/reproducing operation. However, the disk apparatus of the tray loading type is hard to be reduced in size, thickness and weight, because of the placement of the mechanism for controlling and driving in this system.

Under such circumstances, the slot loading type disk apparatuses have been widely used because of their superior advantages for portable use or for equipment on vehicles, i.e., the ease of reduction in size, thickness and weight thereof.

Patent Literature 1: JP-A-07-320371 (page 4 and FIG. 12)

DISCLOSURE OF THE INVENTION

Problems To Be Solved By The Invention

In the slot loading type disk apparatus arranged as above, the respective components or parts of this disk apparatus can be made with reduced sizes so that the disk apparatus can be reduced in size, thickness and weight, suitable for portable use or equipment on vehicles. However, this slot loading type disk apparatus has a problem in that it is needed to provide a mechanism which prevents an user from inserting another disk into the disk apparatus by mistake, while the former disk is placed at the recording/reproducing position. As a mechanism for preventing such double disk insertion, there is a conventional means of providing a double disk insertion-preventive pin at a disk insertion port, which prevents the double disk insertion while the former disk is located at the recording/reproducing position. However, the provision of such a double disk insertion-preventive pin requires a complicated mechanism, and on the contrary, becomes a hindrance to the reduction in the size, thickness and weight of the disk apparatus. In case of the conventional type disk apparatus in which a disk is directly inserted from the disk insertion port, the recording surface of the disk placed at the recording/reproducing position is seen through the disk insertion port, and the insertion of the second disk is prevented by the double disk insertion-preventive pin, if an user inserts the second disk from the disk insertion port by mistake. However, the edge or the edge portion of the second disk sometimes touches the edge or the edge portion of the former disk in the disk apparatus, which, undesirably, leads to the damage of the recording surfaces of the disks.

An object of the present invention is therefore to provide a highly reliable disk apparatus which is reduced in size, thickness and weight, and which also reliably prevents the double insertion of disks with a simple structure, and thus prevents any contact between each of the disks.

Means For Solving Problems

A disk apparatus according to the present invention comprises, as described in claim 1, a stationary frame which is fixed to a casing shaping the external appearance of the disk apparatus and which has an opening for inserting and ejecting a disk-shaped recording medium;

a disk guide which is rotatably held in the proximity of the opening of the stationary frame and which leads the disk-shaped recording medium to the inserting operation and ejecting operation; and a floating unit which is held in a floating state through viscoelastic means in the stationary frame, and which has a function to perform recording and/or reproducing on the disk-shaped recording medium. The disk apparatus, thus arranged, of the present invention can be reduced in size, thickness and weight, and is highly reliable, since the double disk insertion can be prevented with a simple structure, to thereby prevent a contact between each of the disks.

In the disk apparatus of the present invention, as described in claim 2, the floating unit defined in claim 1 includes a disk-carrying member having a roller arm which rotates itself while pressing the disk-shaped recording medium onto the disk guide, so as to carry the disk-shaped recording medium to a desired position, and, when the above disk-carrying member has carried the disk-shaped recording medium to a recording/reproducing position, the roller arm is rotated or moved to close at least a part of the opening for inserting and ejecting the disk-shaped recording medium by the disk guide. The disk apparatus, thus arranged, of the present invention is highly reliable, since the double disk insertion is surely prevented with a simple structure to thereby prevent a contact between each of the disks.

In the disk apparatus of the present invention, as described in claim 3, the floating unit defined in claim 1 include a disk-carrying member having a roller arm which rotates itself while pressing the disk-shaped recording medium onto said disk guide, so as to carry the disk-shaped recording medium to a desired position, and, when the above disk-carrying member has carried the disk-shaped recording medium to a recording/reproducing position, a part of the disk guide is moved in a direction intersecting the locus of the motion of the disk-shaped recording medium to close at least a part of the opening for inserting and ejecting the disk-shaped recording medium by the disk guide. The disk apparatus, thus arranged, of the present invention is highly reliable, since the double disk insertion is surely prevented to thereby prevent a contact between each of the disks.

In the disk apparatus of the present invention, as described in claim 4, the stationary frame defined in claim 1 comprises an upper frame and a lower frame, and the disk guide is so held in suspension from the reverse of the upper frame as to be rotatable a predetermined angle. The disk apparatus, thus arranged, of the present invention can be readily reduced in size, thickness and weight.

In the disk apparatus of the present invention, as described in claim 5, the disk guide defined in claim 1 is foldable in two stages and is folded while the disk guide is leading the disk-shaped recording medium to the inserting operation and ejecting operation. The disk apparatus, thus arranged, of the present invention is highly reliable, since the double disk insertion is surely prevented to thereby prevent a contact between each of the disks.

In the disk apparatus of the present invention, as described in claim 6, a substantially arch-like protruded chin guard is provided at a position where the opening for inserting and ejecting the disk-shaped recording medium is formed in the floating unit defined in claim 1, and, when the disk-shaped recording medium is placed at the recording/reproducing position, the disk guide contacts the chin guide. The disk apparatus, thus arranged, of the present invention is highly reliable, since the double disk insertion is surely prevented with a simple structure, to thereby prevent a contact between each of the disks.

In the disk apparatus of the present invention, as described in claim 7, the disk guide defined in claim 1 has a part which closes the opening for inserting and ejecting the disk-shaped recording medium and which has a recess therein. The disk apparatus, thus arranged, of the present invention is highly reliable, since the double disk insertion is surely prevented with a simple structure, to thereby prevent a contact between each of the disks.

Effect of the Invention

According to the present invention, there can be provided a highly reliable disk apparatus which is reduced in size, thickness and weight and which reliably prevents the double disk insertion with a simple structure, and also prevents a contact between each of disks.

DESCRIPTION OF REFERENCE NUMERALS

1=an upper frame
1a=a hole for engagement
2=a disk guide
2a=a projection
2b=a claw
2c=a recess
2d=an opening
2e=a reinforcing part
3=a clamping member
4=a disk-carrying member
5=a disk carriage-driving member
6=a traverse chassis
7=a disk recording/reproducing-driving member
8=a printed board
9=a lower frame
9a=a recess
10=a floating unit
11=a disk insertion/extraction port 30 =a clamper
31=a clamper-holding member
32=a clamper arm
33=a clamper base
40=a roller arm
40a=a carriage roller
40b=a recess
40c=a claw
41=a disk insertion-detecting lever
42=a disk ejection-detecting lever
50=a motor
51=a control slider
52=a trigger lever
53=a gear train
55=a roller control arm
61 =a chin guard
70=a turn table
71=a spindle motor
72=an optical pickup member
73=a motor
81=a detection switch
90=a clamper spring
101=a disk

BEST MODES FOR CARRYING OUT THE INVENTION

Hereinafter, preferred embodiments of a disk apparatus according to the present invention will be described with reference to the accompanying drawings.

First Embodiment

Figure 1:
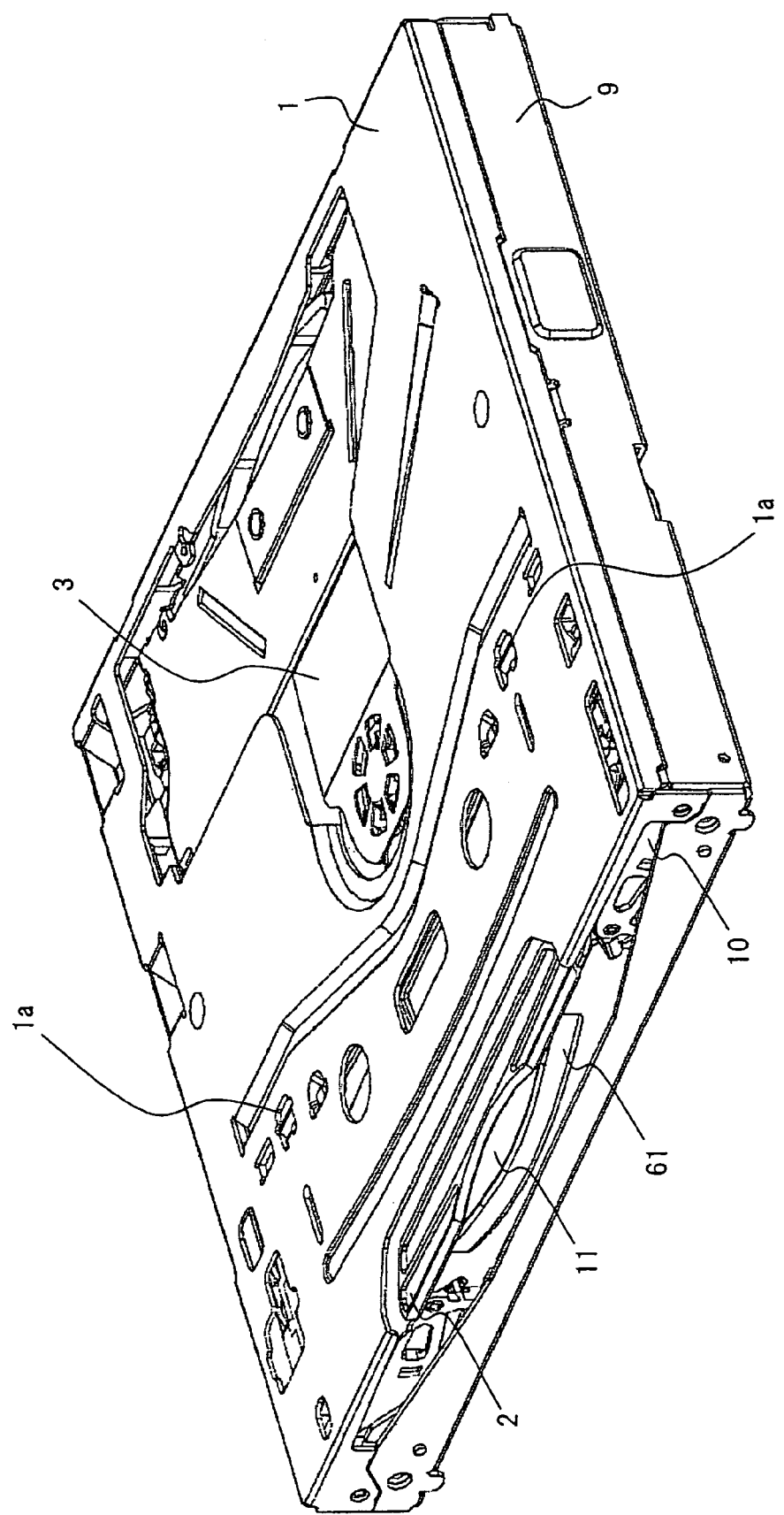
FIG. 1 is a perspective view showing a disk apparatus without an outer casing, according to a first embodiment of the present invention.
Figure 2:
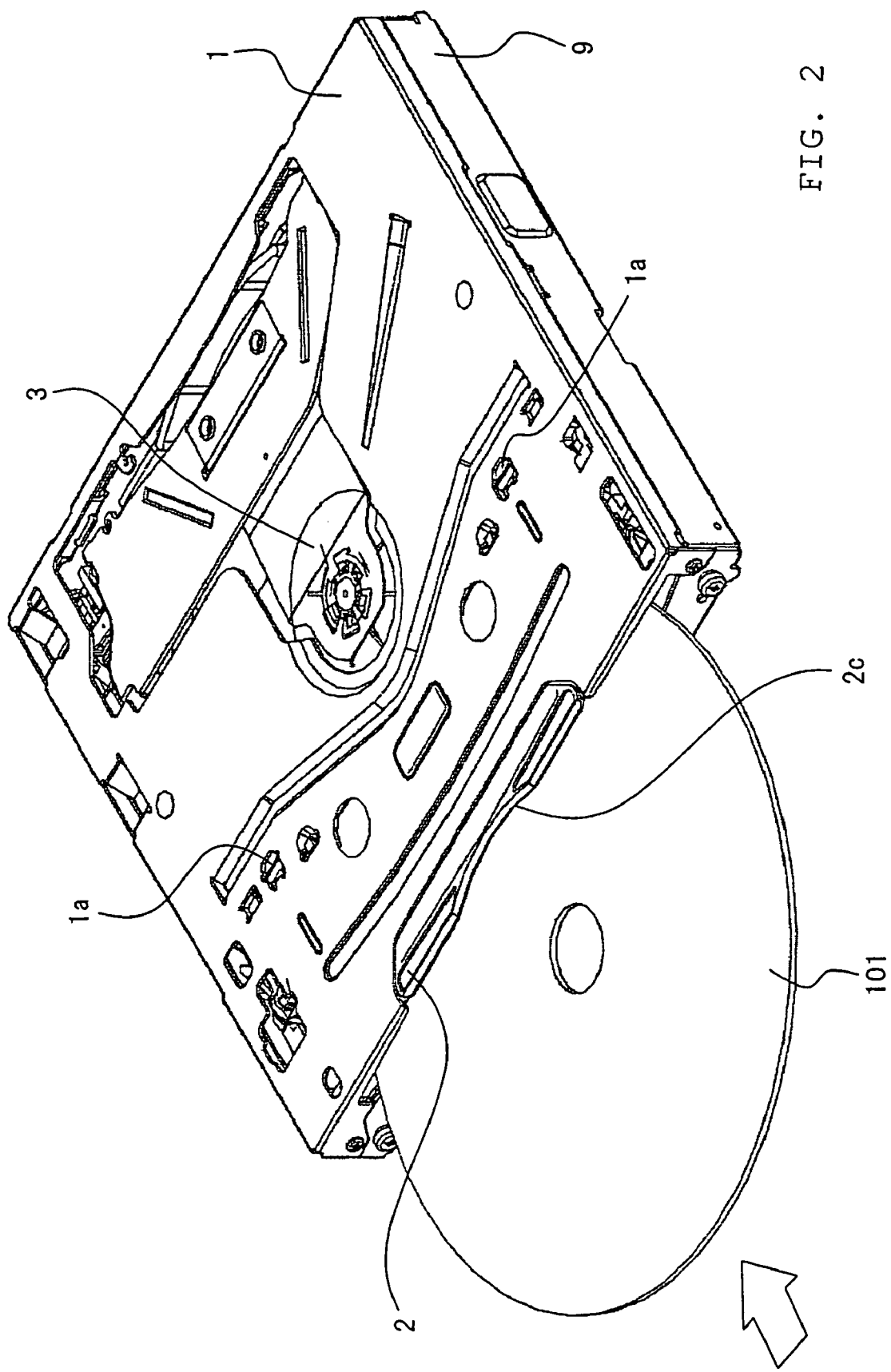
FIG. 2 is a perspective view showing the disk apparatus shown in FIG. 1, into which a disk-shaped recording medium is being inserted.
Figure 3:
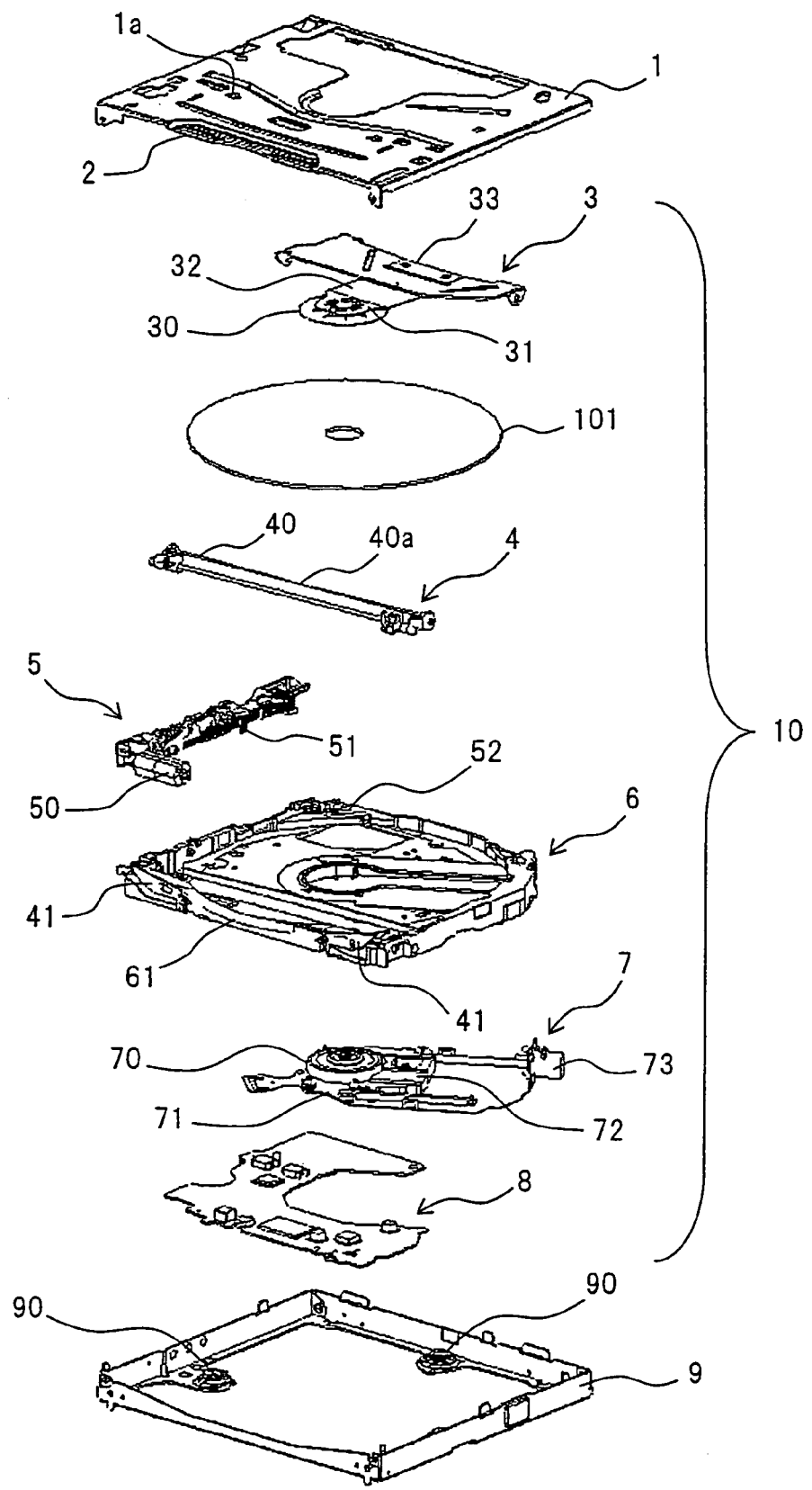
FIG. 3 is an exploded perspective view showing the disk apparatus shown in FIG. 1, illustrating an internal mechanisms thereof.

FIG. 1 is a perspective view showing a disk apparatus without an outer casing, according to the first embodiment of the present invention. FIG. 2 is a perspective view showing the disk apparatus shown in FIG. 1, into which a disk-shaped recording medium, i.e., a disk, is being inserted. FIG. 3 shows an exploded perspective view of the disk apparatus shown in FIG. 1, illustrating the internal mechanisms thereof.

The disk apparatus according to the first embodiment shown in FIGS. 1 to 3 has a function to perform recording and reproducing on a disk-shaped recording medium (hereinafter referred to as a disk) 101 such as CD, DVD or the like. The disk 101 is inserted in its diameter direction and is loaded on a recording/reproducing position to record data thereon or reproduce the date therefrom.

In the disk apparatus of the first embodiment, the stationary frame, fixed to the casing which shapes the external appearance of the disk apparatus, comprises two sections, i.e., an upper frame 1 and a lower frame 9. A floating unit 10 which is supported by a plurality of clamper springs 90 made of a viscoelastic material is provided in the stationary frame. The floating unit 10 is held in a floating state while a recording or reproducing operation is being performed on the disk. The floating unit 10 is locked on the stationary frame by a locking mechanism under other conditions except for the recording/reproducing operation. This locking mechanism will be described in detail later.

As is understood from the exploded perspective view shown in FIG. 3, the floating unit 10 comprises a clamping member 3 which holds an inserted disk 101 between itself and a turn table 70; a disk-carrying member 4 which carries the disk 101; a disk carriage-driving member 5 which includes a motor 50 as a driving source for the disk-carrying member 4; a traverse chassis 6 which locates the disk 101 at a desired recording/reproducing position; a disk recording/reproducing-driving member 7 which drives the disk 101 to rotate so as to record data on or reproduce the data from the disk 101; and a printed board 8 which is disposed on the reverse of the traverse chassis 6 (the other surface of the traverse chassis 6 having the disk placed on its one surface) and which has, thereon, an electric circuit for controlling the driving of the respective mechanisms of the floating unit 10.

Figure 4:
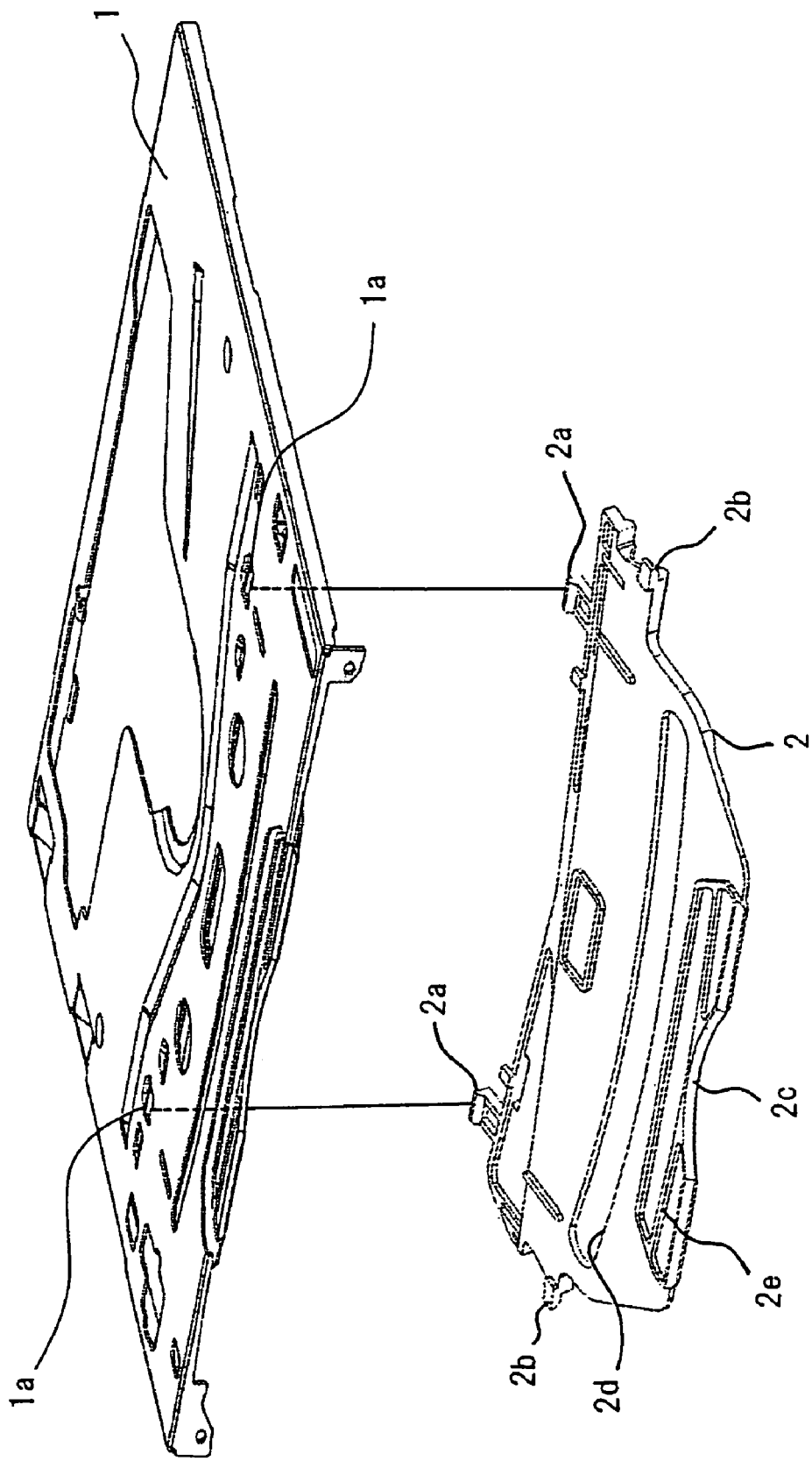
FIG. 4 is an exploded perspective view showing an upper frame 1 of the disk apparatus according to the first embodiment.

FIG. 4 shows the exploded perspective view of the upper frame 1 of the stationary frame. As shown in FIG. 4, the disk guide 2 is rotatably held in suspension at two points from the reverse of the upper frame 1. The two projections 2a, 2a formed on the disk guide 2 at the rear side of the disk apparatus are fitted in and engaged with the holes 1a, 1a formed in the upper frame 1, so that the disk guide 2 can be rotated a predetermined angle on their engaged parts as the center, relative to the upper frame 1, on the front side of the disk apparatus.

The disk guide 2 has claws 2b formed at its both sides, and these claws 2b are engaged with a roller arm 40 described later, when the disk has been completely ejected (or at the completion of the loading of the disk). The front side of the disk guide 2 has a curved recess 2c formed thereon, and a plurality of ribs are formed as a reinforced part 2e in the proximity of this curved recess 2c. Further, an elongated arched opening 2d is formed at the center portion of the disk guide 2, and this elongated arched opening 2d receives and contact a double-inserted disk 101 and prevents its further insertion, and also contributes to the reduction of the weight of the disk guide 2.

Figure 5:
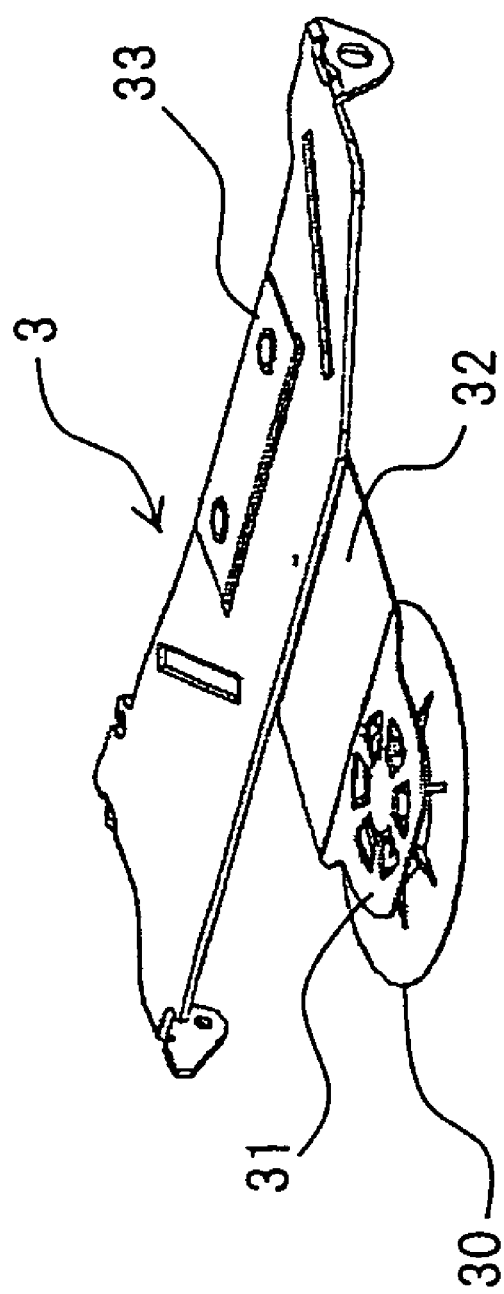
FIG. 5 is a perspective view showing a clamping member 3 of the disk apparatus according to the first embodiment.

FIG. 5 shows a perspective view of the clamping member 3 which holds down the disk 101 at the recording/reproducing position. As shown in FIG. 5, the clamping member 3 comprises a clamper 30 which is used to press down the inserted disk 101, a clamper-holding part 31 which floatably holds the clamper 30, and a clamper base 33 which secures the clamper-holding part 31 to the traverse chassis 6 through a clamper arm 32. The clamper arm 32 which mechanically connects the clamper base 33 to the clamper-holding part 31 is made of an elastic material such as a thin metal sheet, and regulates the pressure of the clamper 30 which holds down the disk. The clamper 30 is held at its center portion by the clamper-holding part 31 while being rotatably engaged with the clamper-holding part 31.

The clamper 30 of the clamping member 3 thus arranged is located above the turn table 70, i.e., at a position away from the turn table 70 and in contact with the upper frame 1, while the disk 101 is inserted and carried inside the disk apparatus. In the clamping member 3, the clamper base 33 is mounted around the shaft of the traverse chassis 6 of the floating unit 10, and the clamper 30 is always urged toward the turn table 70 by urging means (not shown) such as a spring, a clank mechanism or a cam mechanism, provided on the shaft of the traverse chassis. When the disk 101 is not at the recording/reproducing position, the clamper 30 is placed in contact with the upper frame 1 by a stopper means, and thus is located at a position away from the turn table 70. When the inserted disk 101 is carried to the position above the turn table 70 (the recording/reproducing position), the above stopper means is released, so that the urging force from the spring, the clank mechanism or the cam mechanism causes the clamper 30 to press down the turn table 70 through the disk 101. As a result, the disk 101 is reliably placed on the turn table 70 and thus is ready for a recording or reproducing operation.

Figure 6:
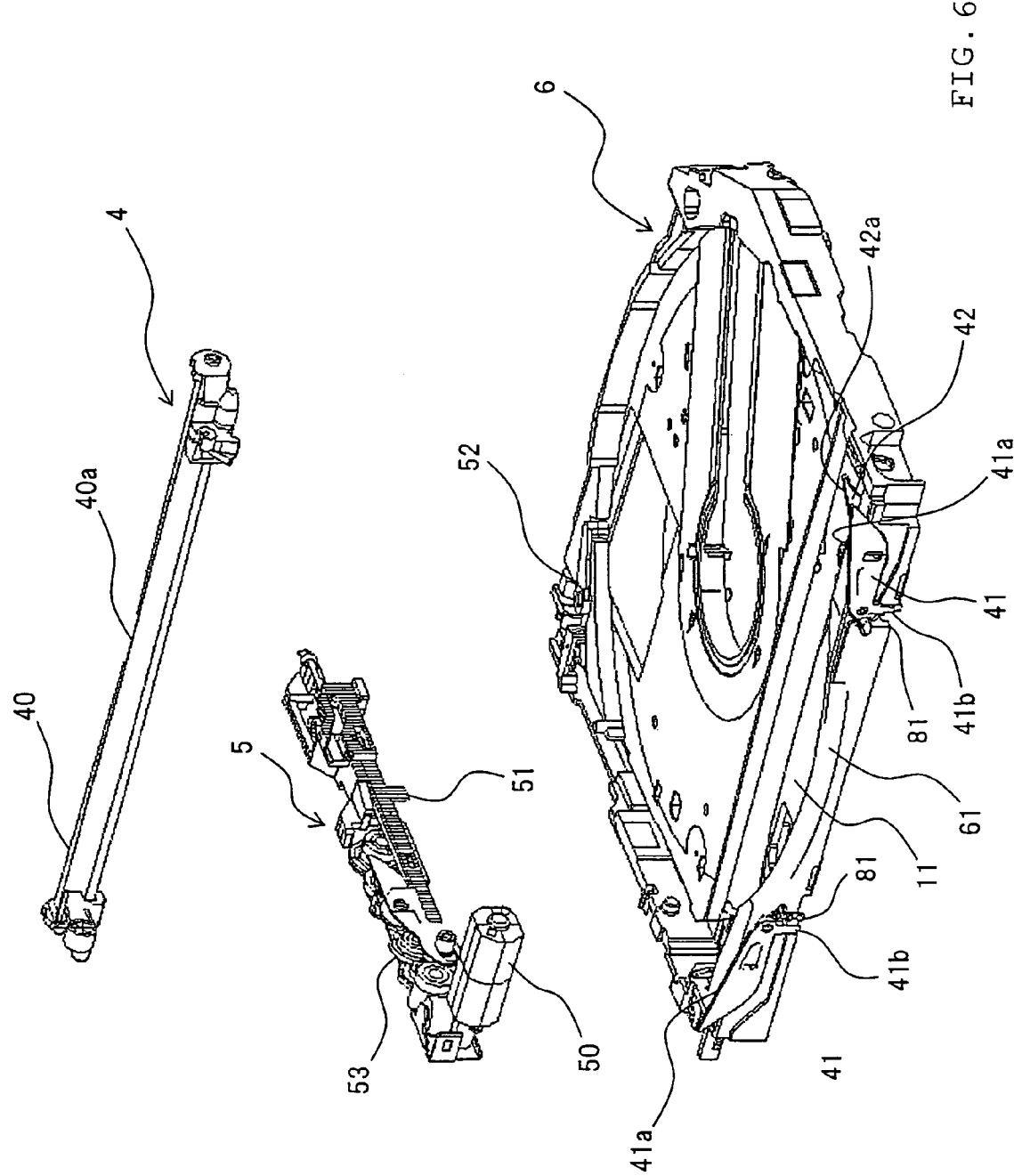
FIG. 6 is perspective views showing a disk-carrying member 4, a disk carriage-driving member 5 and a traverse chassis 6 of a floating unit 10 of the disk apparatus according to the first embodiment.

FIG. 6 shows the perspective views of the disk-carrying member 4, the disk carriage-driving member 5 and the traverse chassis 6 of the flowing unit 10 of the disk apparatus of the first embodiment.

The disk-carrying member 4 has a roller arm 40 having a carriage roller 40a which rotates itself while pressing the inserted disk 101 onto the disk guide 2 to thereby carry the disk 101 in a given direction in the disk apparatus.

As described above, the roller arm 40 has the carriage roller 40a which is in the shape of two cones connected to each other so that the diameter of the carriage roller 40a becomes smaller and smaller toward its center portion and becomes larger and larger toward its both ends. A part of the carriage roller 40a to contact the disk 101 is made of a rubber material. The carriage roller 40a of the roller arm 40 thus arranged can contact only the outer circumference of the disk 101 while the disk 101 is being carried, so as to protect the recording surface of the disk. The carriage roller 40a of the roller arm 40 is usually pressed onto the disk guide 2 by the urging force from a spring, while the disk 101 is located at other positions except for the recording/reproducing position. The carriage roller 40a is moved downward (in a direction away from the upper frame 1) when the carriage of the disk has been completed and when the disk 101 has reached the recording/reproducing position.

The disk carriage-driving member 5 shown in FIG. 6 includes the motor 50 which drives and rotates the carriage roller 40a of the roller arm 40 while the disk is being carried (or while the disk is being loaded or unloaded) in the disk apparatus; a control slider 51 which has a function to hold the traverse chassis 6 immovable on the stationary frame before the insertion of the disk or after the completion of ejection of the disk (after the unloading of the disk); a trigger lever 52 which detects the reaching of the disk 101 to the recording/reproducing position after the completion of the loading of the disk; and a gear train 53 which transmits the rotation of the motor 50 to the roller arm 40 and the control slider 51. The trigger lever 52 is located at a position on the rear side of the traverse chassis 6 in FIG. 6, in which one end of the trigger lever 52 is in contact with the rear end portion of the control slider 51, so that the control slider 51 is moved together with the motion of the trigger lever 52. The other end of the trigger lever 52 within the traverse chassis 6 is located at a position where the other end of the trigger lever 52 can contact the edge of the disk 101, when the disk 101 has reached the position above the recording/reproducing position.

The disk recording/reproducing driving member 7 and the printed board 8 are provided on the traverse chassis 6 which has the above disk-carrying member 4 and the above disk carriage-driving member 5 mounted thereon. Provided on the front of the traverse chassis 6 are disk insertion-detecting levers 41 which are disposed in the proximity of the disk insertion/extraction port 11 so as to detect the insertion of the disk 101 into the disk apparatus, and a disk ejection-detecting lever 42 which is disposed at the rear of the disk insertion-detecting lever 41 so as to detect the ejection of the disk 101. The disk insertion-detecting levers 41 and the disk ejection-detecting lever 42 are usually urged upward by forces from springs, and thus are located at predetermined positions on the upper side, when the disk 101 is not inserted.

As shown in FIG. 6, the disk insertion-detecting levers 41 are disposed at and around both sides of the disk insertion/extraction port 11, and are formed in the shapes of blades which spread to both sides and are raised at both ends. When the disk 101 is inserted from the disk insertion/extraction port 11, the outer edge of the disk 101 presses down the detection faces 41a (the upper faces as seen in FIG. 6) of either or both of the disk insertion-detecting levers 41 which are disposed at both sides, so that the projections 41b formed on the detection levers 41 press detection switches 81 which are microswitches. When the detection switches 81 are pressed, the motor 50 capable of reversely rotating is started to rotate in a given direction, to thereby rotate the carriage roller 40a of the roller arm 40 through the gear train 53. As a result, the inserted disk 101 is carried to the recording/reproducing position by the rotation of the carriage roller 40a of the roller arm 40.

On the other hand, when the disk 101 is ejected, the motor 50 is rotated in a direction reverse to the direction for the insertion of the disk to thereby rotate the carriage roller 40a, so that the disk 101 is carried from the recording/reproducing position to the disk insertion/extraction port 11. The ejection of the disk 101 from the disk insertion/extraction port 11 is detected by the ejection-detecting lever 42. The ejection-detecting lever 42 has substantially the same shape as that of the disk insertion-detecting lever 41, and its upper face serves as the detection face 42a. When this detection face 42a is away from the outer circumference of the disk 101, the completion of the ejection of the disk 101 is detected.

Figure 7:
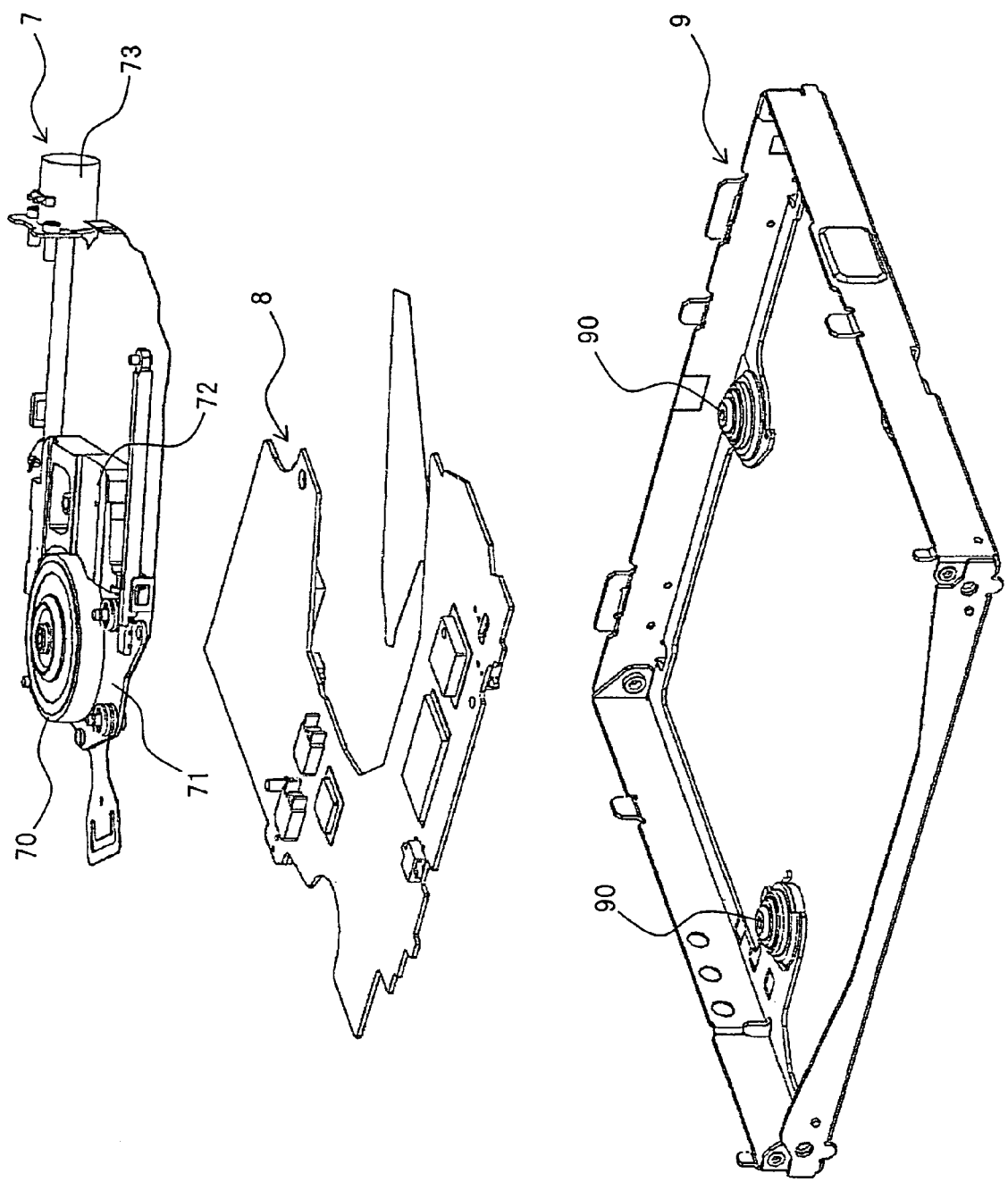
FIG. 7 is an exploded perspective view showing the disk apparatus according to the first embodiment, illustrating a disk recording/reproducing driving member 7, a printed board 8, and a lower frame 9 which supports the traverse chassis 6 through clamper springs 90.

FIG. 7 is an exploded perspective view showing the disk apparatus, illustrating the disk recording/reproducing driving member 7, the printed board 8 and the lower frame 9. While the disk 101 is located at the recording/reproducing position, the lower frame 9 supports the floating unit 10 in a floating state through clamper springs 90.

As shown in FIG. 7, the disk recording/reproducing driving member 7 includes the turn table 70 which is rotated with the disk 101 placed thereon, the spindle motor 71 for rotating the turn table 70, an optical pickup member 72 which records data on or reproduce the data from the disk 101, and an optical pickup driving motor 73 which drives the optical pickup member 72 in the diameter direction of the disk 101. The printed board 8 is attached on the reverse of the traverse chassis 6, and has an electric circuit formed thereon for controlling the driving of the respective mechanisms provided on the traverse chassis 6.

The traverse chassis 6 thus arranged is supported on the lower frame 9 as the stationary frame fixed to the casing, through the clamper springs 90 having viscoelastic functions. Before the insertion of the disk, the traverse chassis 6 is located at a position on the lower side in the frame comprising the upper frame 1 and the lower frame 9, because of the operation of the roller arm 40 to press the disk guide 2 and the control slider 51. When the disk 101 is inserted in this state, the disk 101 enters between the roller arm 40 and the disk guide 2, and is then carried to the recording/reproducing position. When the disk 101 has reached the recording/reproducing position, the traverse chassis 6 is put in a floating state and is lifted, so that the disk 101 is held between the turn table 70 and the clamper 30.

Next, to eject the disk 101, the operation of the roller arm 40 to press the disk onto the disk guide 2 and the control slider 51 compresses the clamper springs 90 to thereby move the traverse chassis 6 downward and locate the same at the lower position in the stationary frame.

As described above, in the disk apparatus of the first embodiment, the carriage roller 40a of the roller arm 40 is moved in the direction away from the upper frame 1 (downward), when the disk 101 has been completely loaded, in other words, when the disk 101 is placed at the recording/reproducing position. When the disk 101 is placed at the recording/reproducing position, the edge of the disk 101 presses down the trigger lever 52. When one end of the trigger lever 52 is pressed down by the disk 101, the other end of the trigger lever 52 slides the control slider 51 forward to the front side of the disk apparatus (see FIG. 6). When the control slider 51 is slid forward, the roller control arm 55 rotates the roller arm 40 downward to the given position. As a result, the disk guide 2 in contact with the carriage roller 40a of the roller arm 40 is held in suspension from the upper frame 1 and comes into contact with the chin guard 61 of the traverse chassis 6 to thereby close the disk insertion/extraction port 11. Therefore, the insertion of the second disk 101 from this disk insertion/extraction port 11 is reliably prevented, while the inserted disk 101 is placed at the recording/reproducing position.

When one end of the trigger lever 52 is pressed down by the disk 101 to thereby slide the control slider 51 forward, the control slider 51 pressing and contacting the reverse of the upper frame 1 is released from the upper frame 1, so that the floating unit 10 is unlocked and thus is held in a floating state. As described above, the floating unit 10 is held in a floating state to make it possible to perform a recording/reproducing operation, when the disk 101 is located at the recording/reproducing position.

The level position of the floating unit 10 in the floating state, in the vertical direction (i.e., the widthwise direction of the disk apparatus) is higher than the level position of the same found during the carrying operation (or the loading operation) in which the carriage roller 40a of the roller arm 40 carries the disk 101 with pressing the disk 101 onto the disk guide 2. This is because the roller arm 40 provided on the floating unit 10 is operated to press the disk guide 2 provided on the stationary frame (the upper frame 1). Therefore, the floating unit 10 is located at a lower position while the disk is being carried, so as to ensure the space for carrying the disk; and the floating unit 10 is moved upward so as to reliably hold the disk, when the disk has been placed at the recording/reproducing position.

Next, the disk-ejecting operation is described. When a command for ejection of the disk 101 from the recording/reproducing position is inputted, the roller arm 40 is rotated and moved upward together with the disk guide 2 by the roller control arm 55. At this moment of time, the carriage roller 40a of the roller arm 40 starts rotating itself in a direction for ejecting the disk 101, and presses the disk 101 onto the disk guide 2, so as to eject the same. Also, at this moment of time, the control slider 51 is slid to the rear side of the disk apparatus to contact the upper frame 1 as the stationary frame to thereby lock the floating unit 10 having the control slider 51 provided therein. In this locking state, the clamper springs 90 between the floating unit 10 and the lower frame 9 are compressed.

Figure 8:
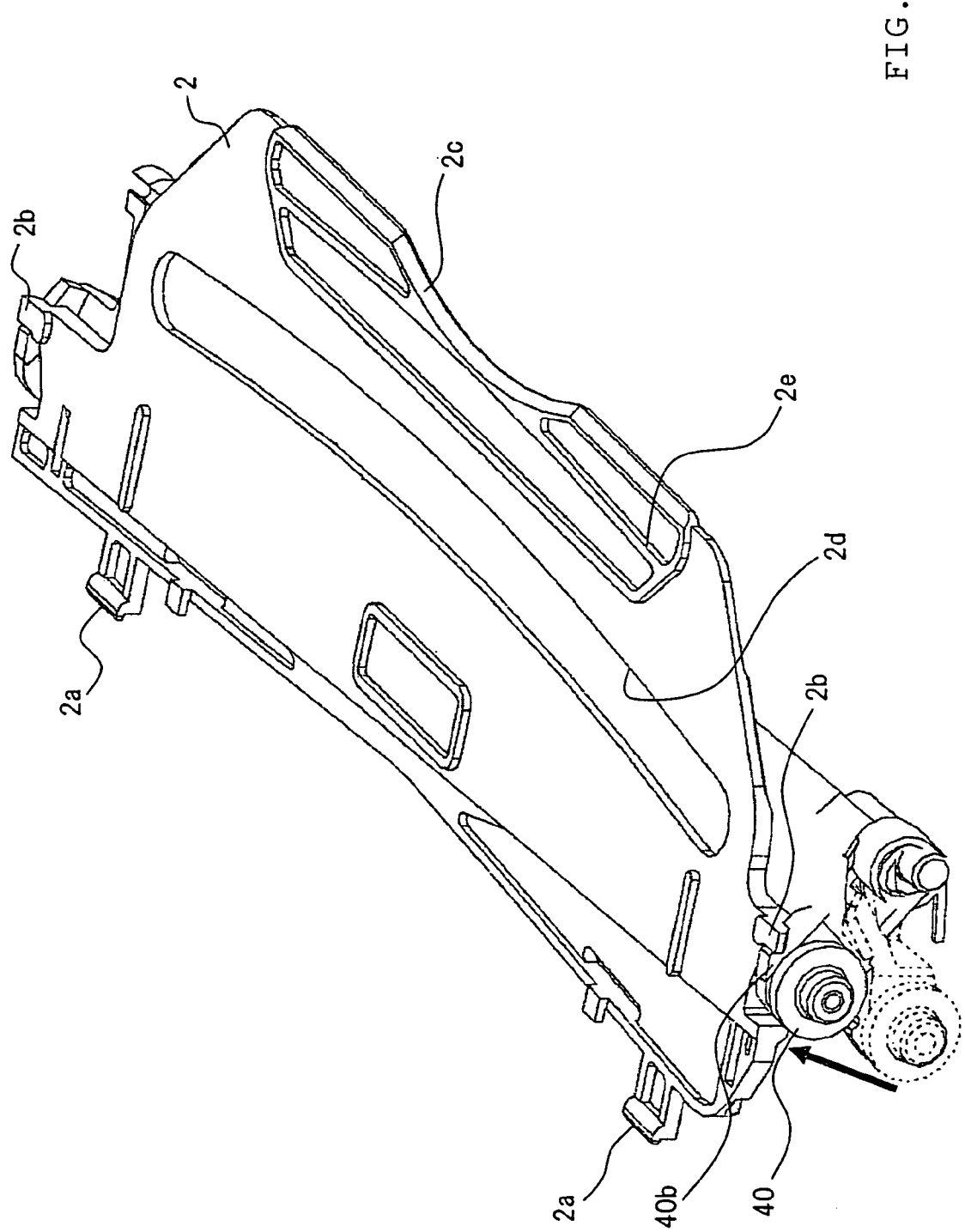
FIG. 8 is a perspective view showing the disk-carrying member 4 and a disk guide 2, illustrating their engagement.
Figure 9:
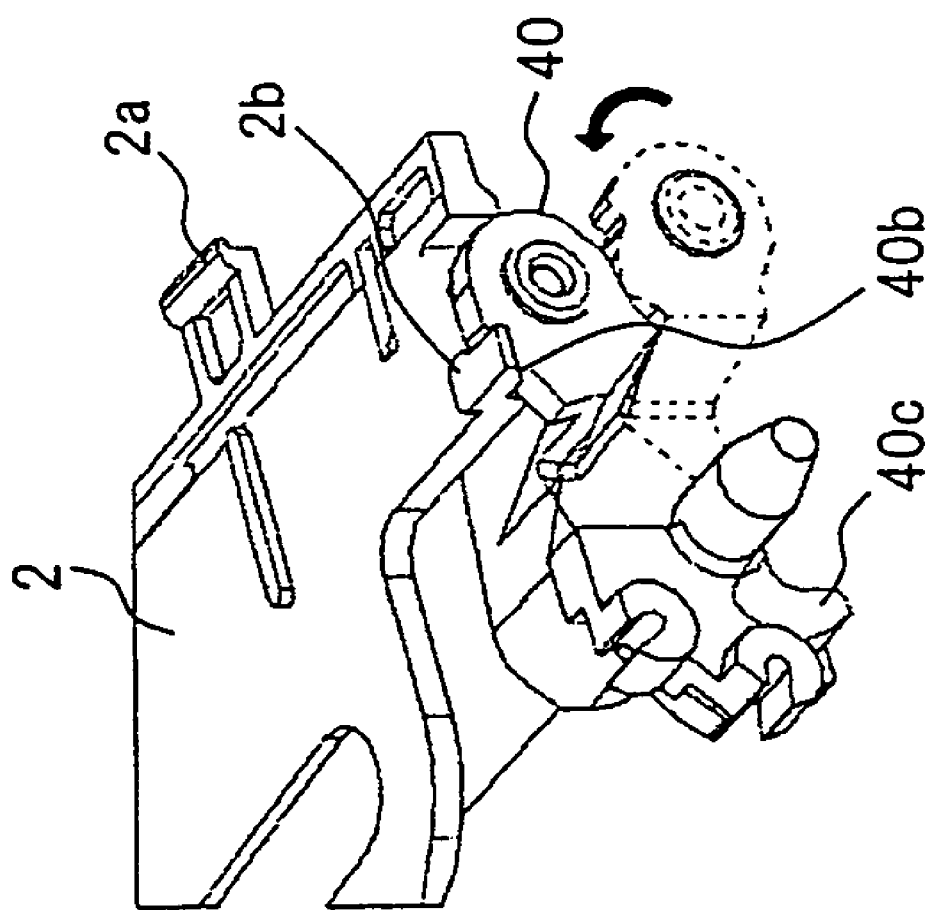
FIG. 9 is a perspective view showing the right side section of the disk-carrying member shown in FIG. 11, on the front side of the disk apparatus, which is seen from our side.

When an user removes the disk 101 after the detection of the ejection of the disk 101 by the disk ejection-detecting lever 42, the roller arm 40 is lifted to the upper frame 1 due to the urging forces from the springs, so that the engaging parts 40b of the roller arm 40 are engaged with the claws 2b formed on the disk guide 2 in contact with the upper frame 1. The perspective view shown in FIG. 8 illustrates the engagement of the claws 2b of the disk guide 2 with the engaging parts 40b of the roller arm 40. The perspective view shown in FIG. 9 illustrates the engagement of the engaging part 40b of the roller arm 40 with the claw 2b of the disk guide 2 on the right side of the disk apparatus, which is seen from our side.

Figure 10:
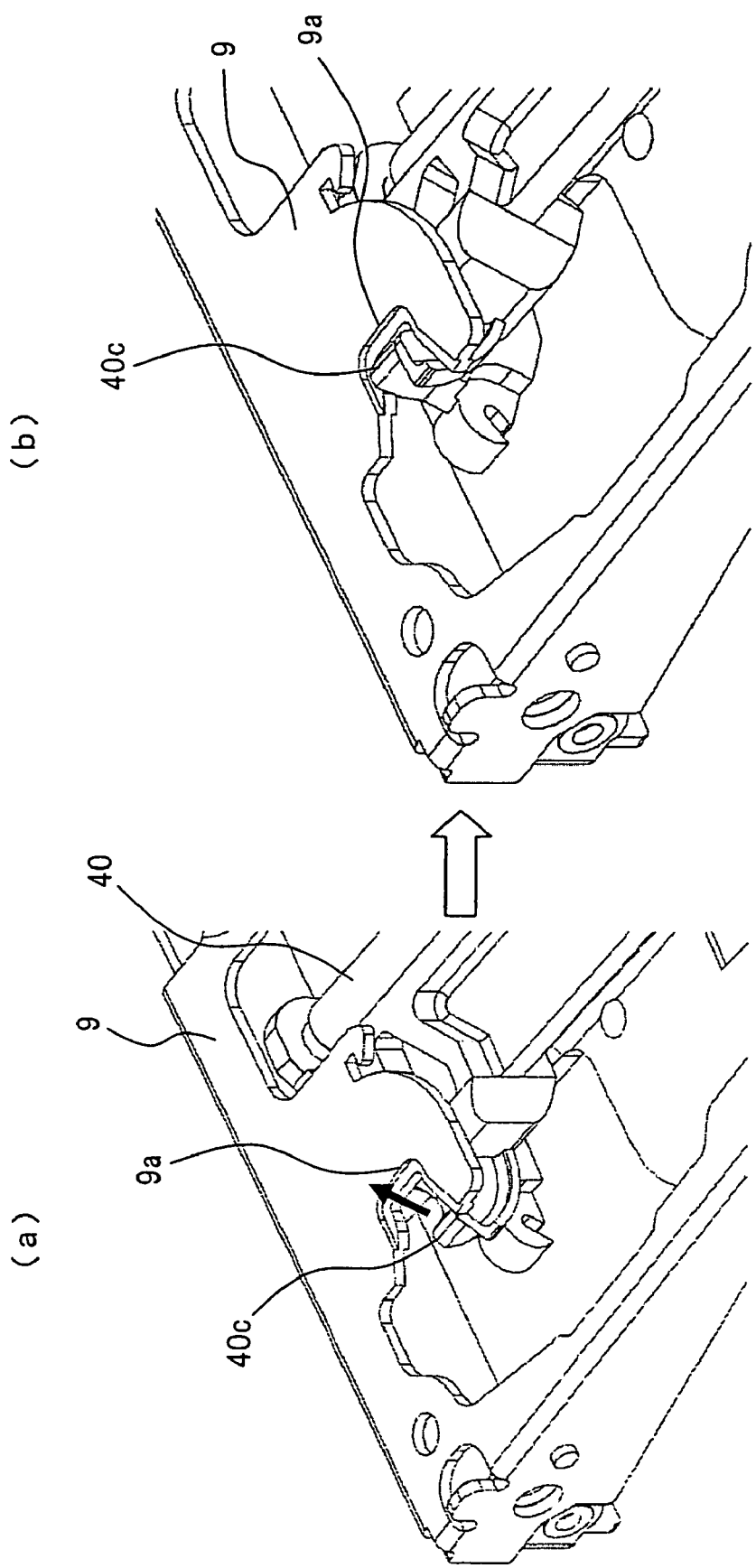
FIG. 10 is an enlarged perspective views showing a part of the reverse side of the disk apparatus according to the first embodiment, illustrating an operation for engaging a claw 40c of a roller arm 40 with recess 9a of the lower frame 9.

In the disk apparatus of the first embodiment, when the ejection of the disk 101 is completed, the roller arm 40 is lifted to the upper frame 1 by the urging forces from the springs as described above, to thereby engage the claws 2b of the disk guide 2 with the engaging parts 40b of the roller arm 40, and simultaneously to engage the claws 40c of the roller arm 40 with the recesses 9a of the lower frame 9 as the stationary frame so as to inhibit the rotation of the roller arm 40. The enlarged perspective views shown in FIG. 10 illustrate a part of the reverse side of the disk apparatus of the first embodiment, and also illustrate the operation of engaging the claw 40c of the roller arm 40 with the recess 9a of the lower frame 9. (a) of FIG. 10 shows the claw 40c of the roller arm 40 and the recess 9a of the lower frame 9, while the disk apparatus is under the recording/reproducing operation, and (b) of FIG. 10 shows the engagement of the claw 40c of the roller arm 40 with the recess 9a of the lower frame 9, when the ejection of the disk is completed.

After the completion of the ejection of the disk 101 from the disk apparatus of the first embodiment, the control slider 51 comes into contact with the upper frame 1, while the claws 2b of the disk guide 2 are engaged with the engaging parts 40b of the roller arm 40 (see FIGS. 8 and 9), and the claws 40c of the roller arm 40 are engaged with the recesses 9a of the lower frame 9 (see (b) of FIG. 10). As a result, in the disk apparatus of the first embodiment, the floating unit 10 is surely held immovable on the stationary frame after the completion of the ejection of the disk 101.

Figure 11:
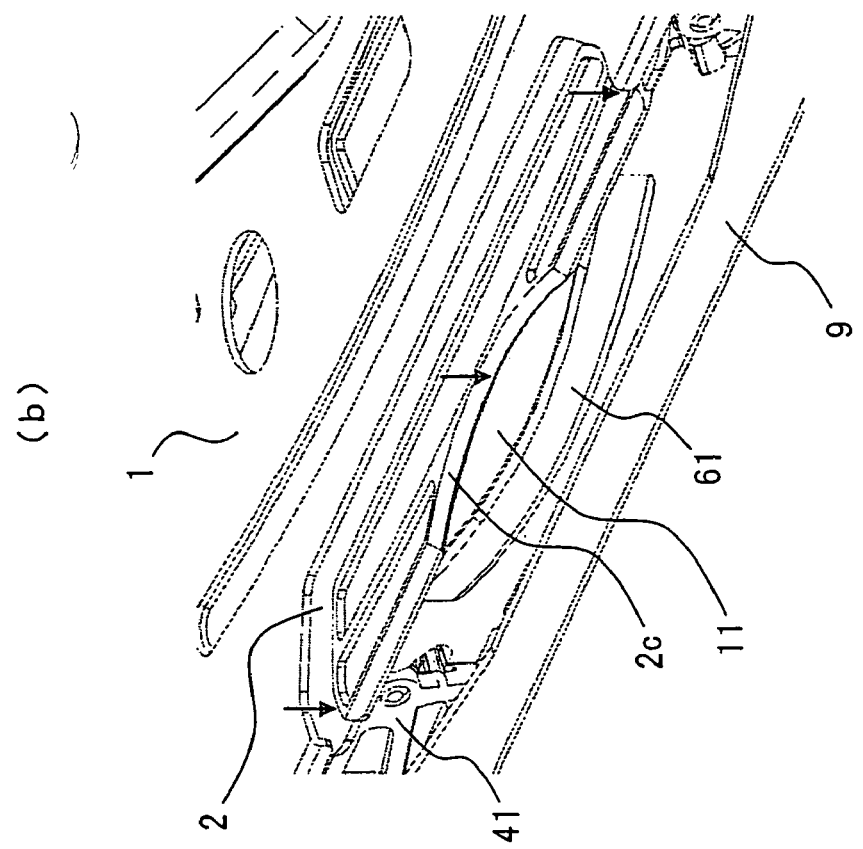
FIG. 11 includes (a) and (b), and (a) shows an enlarged perspective view of the disk apparatus according to the first embodiment, on which a disk 101 is not loaded, and (b) shows an enlarged perspective view of the same disk apparatus on which the disk 101 is loaded.
Figure 11:
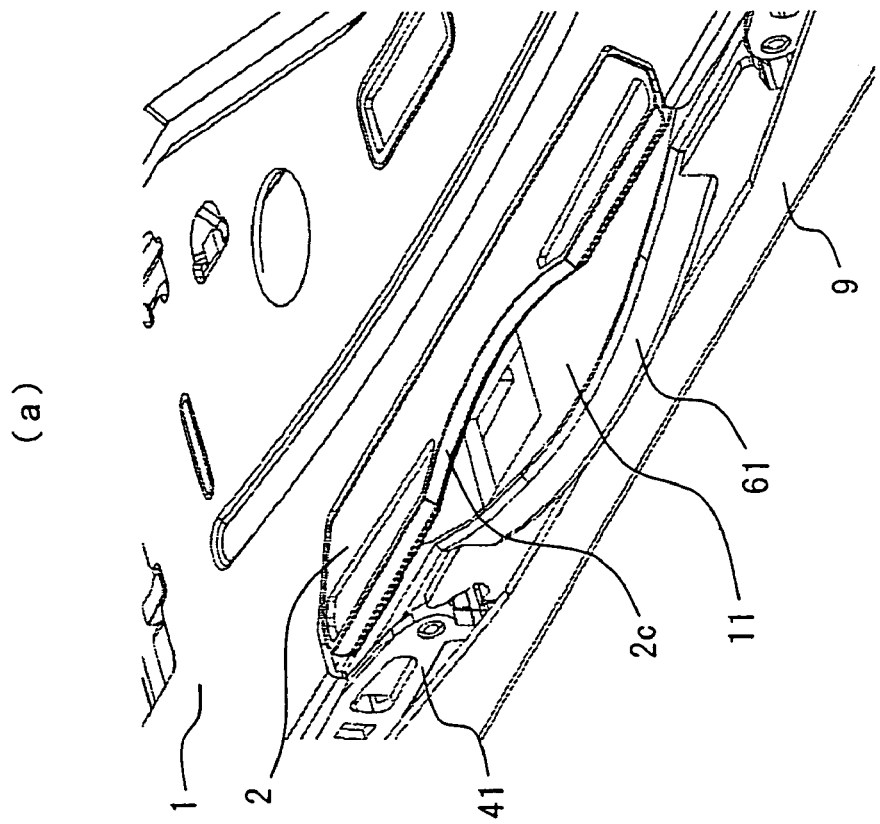

FIG. 11, including (a) and (b), shows the enlarged perspective views of the disk insertion/extraction port 11 and its peripheral part of the disk apparatus of the first embodiment. (a) of FIG. 11 shows the disk apparatus on which the disk 101 has not been loaded, and (b) of FIG. 11 shows the disk apparatus on which the disk 101 has been loaded. When the disk 101 has not yet been loaded as shown in (a) of FIG. 11, the disk guide 2 is lifted to open the disk insertion/extraction port 11. When the disk 101 has been completely loaded as shown in (b) of FIG. 11, the disk guide 2 is rotated while its forward part directs downward and contacts the chin guard 61. As a result, the disk insertion/extraction port 11 is partially closed to thereby prevent the insertion of another disk 101. In the first embodiment, the rotation angle of the disk guide 2 is set at about 3 degrees, although this rotation degree may be changed according to the shape of the disk guide 2 and the position of engaging with the upper frame 1, in so far as this rotation angle allows the disk guide 2 to come into contact with the chin guard 61 to thereby prevent the double insertion of another disk 101.

In the disk apparatus of the first embodiment, a curved recess 2c is formed on the forward part of the disk guide 2, in order that an user can be prevented from lifting the disk guide 2 closing the disk insertion/extraction port 11 with a second disk which the user is about to insert into the disk apparatus already having the disk 101 loaded thereon.

Also in the disk apparatus of the first embodiment, the loaded disk 101 is placed inside the chin guard 61, so that another disk is not permitted to directly contact the disk 101 on which a recording or reproducing operation is being performed, and in particular, another disk is perfectly prevented from contacting the recording surface of the disk 101.

While the disk apparatus of the first embodiment is provided with the disk guide 2 which is made of one flat plate, this disk guide 2 may be of two folding type, comprising a main body part and a forward part which can be folded and laid on the main body part. In the disk guide of this type, the forward part of the disk guide is folded and laid on the main body part thereof, while a disk is being guided. When the disk is placed on the recording/reproducing position and when the disk guide is rotated with its forward part directing downward, the forward part of the disk guide projects due to its gravity and closes the disk insertion/extraction port.

As has been fully described in the part of the first embodiment, in the disk apparatus of the present invention, the disk guide 2 for leading the disk 101 in the disk apparatus is provided on the stationary frame, and has a function to prevent the double insertion of another disk 101 while a recording/reproducing operation is being performed on the first disk, thus contributing to the improvement of the reliability of the disk apparatus.

In the disk apparatus of the present invention, the disk guide 2 for leading the disk is provided on the upper frame 1 as the stationary frame to thereby assemble the disk apparatus with a reduced thickness and size, as compared with a disk apparatus which includes a disk guide provided on a floating unit. In case where a disk guide is provided on the floating unit, a space for holding the floating unit in a floating state is needed between the disk guide and the stationary frame. In contrast, in the disk apparatus of the first embodiment of the present invention, the disk guide 2 is provided on the stationary frame so as not to need such a holding space between the disk guide 2 and the stationary frame. Further, in the disk apparatus of the first embodiment of the present invention, the space between the disk guide 2 and the floating unit 10 serves as the space for carrying the disk and concurrently as the space for holding the floating unit 10 in a floating state. Furthermore, in the disk apparatus of the present invention, the roller arm 40 presses the disk onto the disk guide 2 during the disk-carrying operation, to thereby form a desirable sized space for carrying the disk; and the roller arm 40 is rotated to cause the clamping member 3 to hold the disk during the recording/reproducing operation, to thereby form a desirable sized space for holding the floating unit 10 in a floating state, relative to the stationary frame. As has been described above, the disk apparatus of the present invention makes it sure to form a desired carrying space and a desired holding space, concurrently achieving the reduction in size, thickness and weight.

In this regard, while the foregoing embodiment have been described as the disk apparatuses capable of performing both of recording and reproducing operations on the disks, the scope of the present invention is not limited to these disk apparatuses, and also includes recording apparatuses and reproducing apparatuses for disk-shaped recording media.

INDUSTRIAL APPLICABILITY

The present invention is especially useful for reproducing on disk-shaped recording media such as CD and compact disk apparatuses which perform recording or DVD. The present invention makes it possible to provide a thinner disk apparatus capable of reliably clamping a disk inserted into the disk apparatus.

What is claimed is:

1. A disk apparatus comprising:
    a stationary frame having an opening for inserting and ejecting a disk-shaped recording medium,
    a disk guide which is rotatably provided in the proximity of the opening of said stationary frame, and which leads said disk-shaped recording medium to the inserting operation and the ejecting operation, and
    a floating unit which is held in a floating state through elastic component in said stationary frame, and which has a function to perform a recording and/or reproducing operation on said disk-shaped recording medium,
    wherein said floating unit includes a roller arm for carrying said disk-shaped recording medium to a desired position, and wherein said roller arm moves to thereby permit the disk guide to close at least a part of the opening.

2. A disk apparatus as recited in claim 1, wherein said floating unit includes a disk-carrying member having the roller arm which rotates itself while pressing said disk-shaped recording medium onto said disk guide, so as to carry said disk-shaped recording medium to a desired position, and wherein, when said disk-carrying member has carried said disk-shaped recording medium to a recording/reproducing position, a part of said disk guide is moved in a direction intersecting the locus of the motion of said disk-shaped recording medium to close at least a part of the opening for inserting and ejecting said disk-shaped recording medium by said disk guide.

3. A disk apparatus as recited in claim 1, wherein said stationary frame comprises an upper frame and a lower frame, and wherein said disk guide is so held in suspension from the reverse of said upper frame as to be rotatable at a predetermined angle.

4. A disk apparatus as recited in claim 1, wherein a substantially arch-like protruded chin guard is provided at a position where the opening for inserting and ejecting said disk-shaped recording medium is formed in said floating unit, and wherein, when said disk-shaped recording medium is placed at the recording/reproducing position, said disk guide contacts said chin guide.

5. A disk apparatus as recited in claim 1, wherein said disk guide has a part which closes the opening for inserting and ejecting said disk-shaped recording medium and which has a recess therein.

6. A disk apparatus comprising:
    a stationary frame having an opening for inserting and ejecting a disk-shaped recording medium,
    a disk guide which is rotatably provided in the proximity of the opening of said stationary frame, and which leads said disk-shaped recording medium to the inserting operation and the ejecting operation, and
    a floating unit which is held in a floating state through elastic component in said stationary frame, and which has a function to perform a recording and/or reproducing operation on said disk-shaped recording medium,
    wherein said floating unit includes a disk-carrying member having a roller arm which rotates itself while pressing said disk-shaped recording medium onto said disk guide, so as to carry said disk-shaped recording medium to a desired position, and wherein, when said disk-carrying member has carried said disk-shaped recording medium to a recording/reproducing position, said roller arm is rotated or moved to thereby permit the disk guide to close at least a part of the opening for inserting and ejecting said disk-shaped recording medium.

7. A disk apparatus comprising:
    a stationary frame having an opening for inserting and ejecting a disk-shaped recording medium,
    a disk guide which is rotatably provided in the proximity of the opening of said stationary frame, and which leads said disk-shaped recording medium to the inserting operation and the ejecting operation, and
    a floating unit which is held in a floating state through elastic component in said stationary frame, and which has a function to perform a recording and/or reproducing operation on said disk-shaped recording medium,
    wherein said disk guide is foldable in two stages and is folded while said disk guide is leading said disk-shaped recording medium to the inserting operation and ejecting operation.

* * * * *